May 14, 1935.  C. DORNIER  2,001,529
ROTOR FOR HELICOPTERS
Filed Jan. 22, 1934   2 Sheets-Sheet 1

Inventor:
Claude Dornier
by Karl Michaelis
Atty.

May 14, 1935.  C. DORNIER  2,001,529
ROTOR FOR HELICOPTERS
Filed Jan. 22, 1934   2 Sheets-Sheet 2

Inventor:
Claude Dornier
by Karl Kichauis
Atty.

Patented May 14, 1935

2,001,529

UNITED STATES PATENT OFFICE 2,001,529

ROTOR FOR HELICOPTERS

Claude Dornier, Friedrichshafen-on-the-Bodensee, Germany

Application January 22, 1934, Serial No. 707,831
In Germany February 2, 1933

8 Claims. (Cl. 244—18)

My invention relates to rotors for helicopters, i. e. for a form of aircraft the support of which in the air is derived from the vertical component of the thrust produced by rotating airfoils. Such a rotor replaces the wings of a normal airplane and exerts the aerodynamic lift which is normally exerted by the wings. Its airfoils are rotary wing elements, and the rotor itself is a rotary wing structure.

In rotors or rotary wing structures of the kind described it has already been suggested to produce stabilizing or other forces by adjusting ailerons or the like on the airfoils, or by twisting the airfoils, so as to influence the trim of the helicopter.

It is an object of my invention to attain the same end in rotors which are rotated by the reaction of a fluid under pressure issuing from reaction nozzles combined with the airfoils of the rotor. To this end I make the discharge nozzles at opposite ends of the rotor adjustable about an axis substantially parallel to the longitudinal axis of the rotor.

By adjusting the nozzles the reaction effect of the issuing fluid can be varied or interrupted. If the nozzles are adjusted periodically during each revolution of the rotor, couples are produced which influence, or maintain, the equilibrium of the helicopter. If the nozzles are turned through 180° from their normal position, the reaction effect will brake the rotor.

The nozzles may be adjusted by hand, or adjusting means similar to those which are used for adjusting the ailerons or the like referred to above may be provided.

In the drawings affixed to this specification and forming part thereof a rotor embodying my invention is illustrated diagrammatically by way of example.

Figure 1:
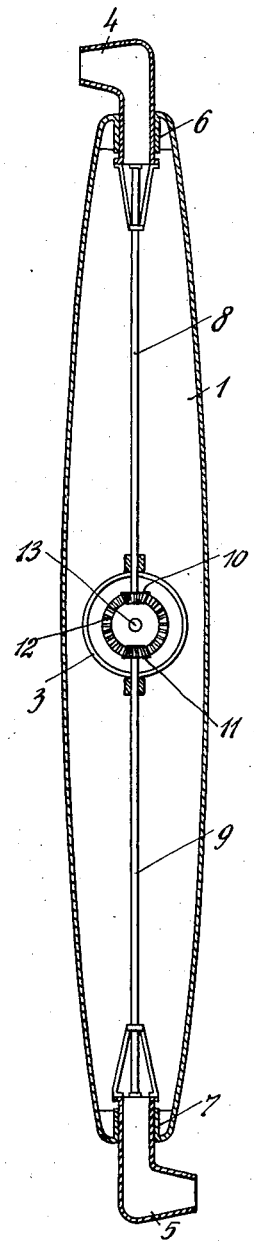
Fig. 1 is a section of the rotor in the plane of rotation.

Referring to the drawings, 1 is the rotor constituted by two airfoils arranged in axial alignment. The rotor is equipped with a flanged member 2 by which it is mounted on the fuselage of the helicopter (not shown) and 3 is a pipe for forcing a gaseous fluid (air) under pressure axially through the hollow airfoils.

4 and 5 are reaction nozzles mounted to turn, in bearings 6 and 7, at the outer ends of the airfoils. They are secured to spindles 8 and 9 by means of spiders 15 and 16, respectively.

The spindles extend substantially in parallel to the longitudinal axes of the airfoils.

10 and 11 are bevel pinions on the inner ends of the spindles 8 and 9, and 12 is a bevel gear which meshes with the two pinions and is secured on a shaft 13 extending in the common axis of rotation of the airfoils.

Normally shaft 13 is rotated at the same speed as the rotor so that the position of the nozzles 4 and 5 with respect to the rotor is not influenced. If, however, shaft 13 is caused to lag or to lead with respect to the rotor, the nozzles are turned about their axes so that their discharge ends are displaced in opposite sense and the reaction effect is varied in conformity with the displacement.

Figure 3:
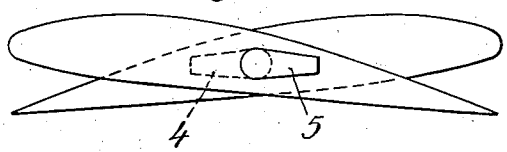
Figs. 3 and 4 are diagrammatical end views of the airfoils showing different positions of the nozzles.

Fig. 3 illustrates the position of nozzles 4 and 5 in the plane of rotation; no stabilization moment is here created.

Figure 2:
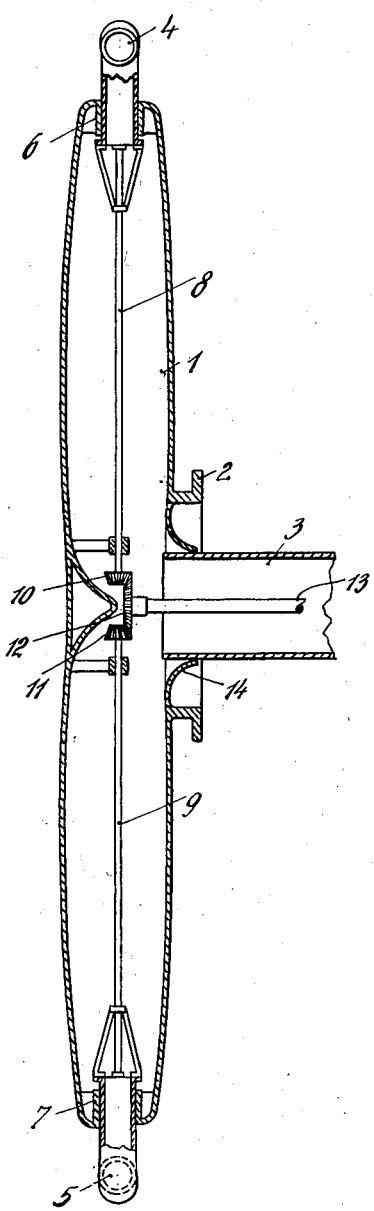
Fig. 2 is a section in the plane of the axis of rotation.
Figure 4:
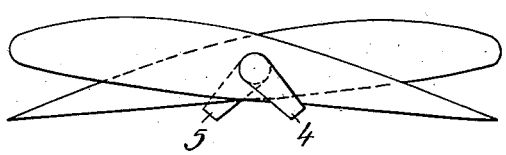

Fig. 4 illustrates the nozzles after they have been moved in accordance with Figs. 1 and 2, where they project from the plane of rotation in the same direction.

Figure 5:
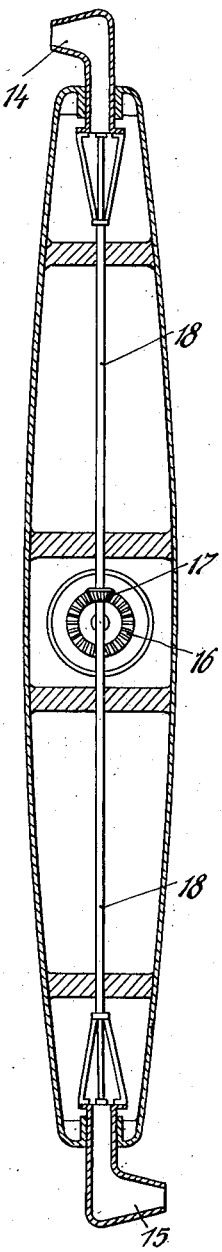
Fig. 5 is a section, similar to Fig. 1, showing the nozzles mounted on a common spindle

Fig. 5 is a section similar to Fig. 1, in which the two nozzles are fixed to and operated by a single spindle, 14 and 15 are the nozzles, 18 is the spindle, 17 is a bevel gear mounted on the spindle and meshing with the bevel gear 16 corresponding to the bevel gear 12 in Fig. 2.

Figure 6:
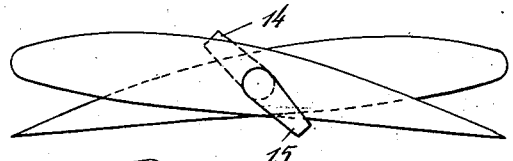
Fig. 6 is an end view illustrating the common adjustment of the nozzles.

Fig. 6 illustrates the simultaneous movement of nozzles 14 and 15.

Figure 7:
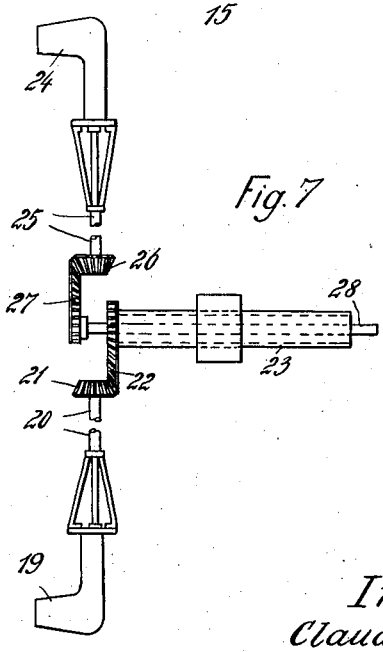
Fig. 7 illustrates a third modification, showing merely the nozzles and the mechanism for adjusting same, while the airfoils are omitted.

Fig. 7 shows a pair of nozzles 19 and 24 capable of being moved independently of one another. Nozzle 19 is fixed to a spindle 20 bearing a bevel gear 21 which meshes with bevel gear 22 mounted on the hollow shaft 23. Nozzle 24 is fixed with the spindle 25 bearing the bevel gear 26 which meshes with bevel gear 27 mounted on the shaft 28.

I wish it to be understood that I do not desire to be limited to the exact details of construction shown and described for obvious modifications will occur to a person skilled in the art.

I claim:—

1. A rotor for helicopters comprising a pair of airfoils mounted for rotation about a common axis and formed with axial gas passages, a reaction nozzle mounted at the outer end of each airfoil for adjustment about an axis substantially parallel to the longitudinal axis of said airfoil, and means for adjusting each nozzle.

2. A rotor for helicopters comprising a pair of airfoils mounted for rotation about a common axis and formed with axial gas passages, a reaction nozzle mounted at the outer end of each airfoil for adjustment about an axis substantially parallel to the longitudinal axis of said airfoil, and means for simultaneously adjusting said nozzles.

3. A rotor for helicopters comprising a pair of airfoils mounted for rotation about a common axis and formed with axial gas passages, a reaction nozzle mounted at the outer end of each airfoil for adjustment about an axis substantially parallel to the longitudinal axis of said airfoil, and means for simultaneously adjusting said nozzles in the same direction.

4. A rotor for helicopters comprising a pair of airfoils mounted for rotation about a common axis and formed with axial gas passages, a reaction nozzle mounted at the outer end of each airfoil for adjustment about an axis substantially parallel to the longitudinal axis of said airfoil, and means for simultaneously adjusting said nozzles in opposite directions.

5. A rotor for helicopters comprising a pair of airfoils mounted for rotation about a common axis and formed with axial gas passages, a spindle extending axially of each airfoil, a reaction nozzle mounted on the outer end of each spindle and means for operating each spindle independently of the other.

6. A rotor for helicopters comprising a pair of airfoils mounted for rotation about a common axis and formed with axial gas passages, a spindle extending axially of each airfoil, a reaction nozzle mounted on the outer end of each spindle and means for operating said spindles simultaneously.

7. A rotor for helicopters comprising a pair of airfoils mounted for rotation about a common axis and formed with axial gas passages, a spindle extending axially of each airfoil, a reaction nozzle mounted on the outer end of each spindle and means for operating said spindles simultaneously in the same sense.

8. A rotor for helicopters comprising a pair of airfoils mounted for rotation about a common axis and formed with axial gas passages, a spindle extending axially of each airfoil, a reaction nozzle mounted on the outer end of each spindle and means for operating said spindles simultaneously in opposite directions.

CLAUDE DORNIER.